June 20, 1939. H. J. SCHRADER 2,162,827
OSCILLOGRAPH APPARATUS
Filed Dec. 28, 1934 2 Sheets-Sheet 1

INVENTOR.
H. J. SCHRADER
BY H.G.Grover
ATTORNEY.

Patented June 20, 1939

2,162,

UNITED STATES PATENT OFFICE 2,162,827

OSCILLOGRAPH APPARATUS

Harold J. Schrader, Haddon Heights, N. J., assignor to Radio Corporation of America, a corporation of Delaware Application December 28, 1934, Serial No. 760,062

8 Claims. (Cl. 175—183)

The present invention relates to oscillograph apparatus and particularly to devices for use in connection therewith so as to control the operation and the form of the wave trace appearing upon the device.

In accordance with the present invention the oscillograph apparatus has been illustrated as comprising a cathode ray tube and it is an object of the invention to provide a means for controlling particularly the usual sweep circuit oscillator so that the deflection of the resulting cathode ray beam bears a pre-established relationship to the phenomena to be observed on the fluorescent viewing screen of the tube.

More particularly, the device to be herein disclosed is for controlling the periodicity of an oscillator circuit used to control the sweep frequency of a cathode ray beam in oscillographic apparatus. This control may be accomplished, for example, by controlling the periodicity of discharge of a grid-controlled discharge tube of the type used in many sweep circuit control systems, for example, that disclosed by A. W. Vance in his co-pending application Serial No. 544,959.

The invention in its present form finds particular application to use in connection with the alignment of radio circuits so that whatever adjustments may be made may be checked with great ease by observing the pattern of the wave trace appearing upon the fluorescent viewing screen of the tube.

Other objects of the invention are to provide apparatus of the nature above suggested and of the type to be hereinafter described which may operate in conjunction with known and existing types of oscillograph apparatus and also to provide an impulse generator which will be relatively simple in its construction and arrangement of parts, which can be manufactured cheaply and which will be extremely efficient in its operation.

Figure 1:
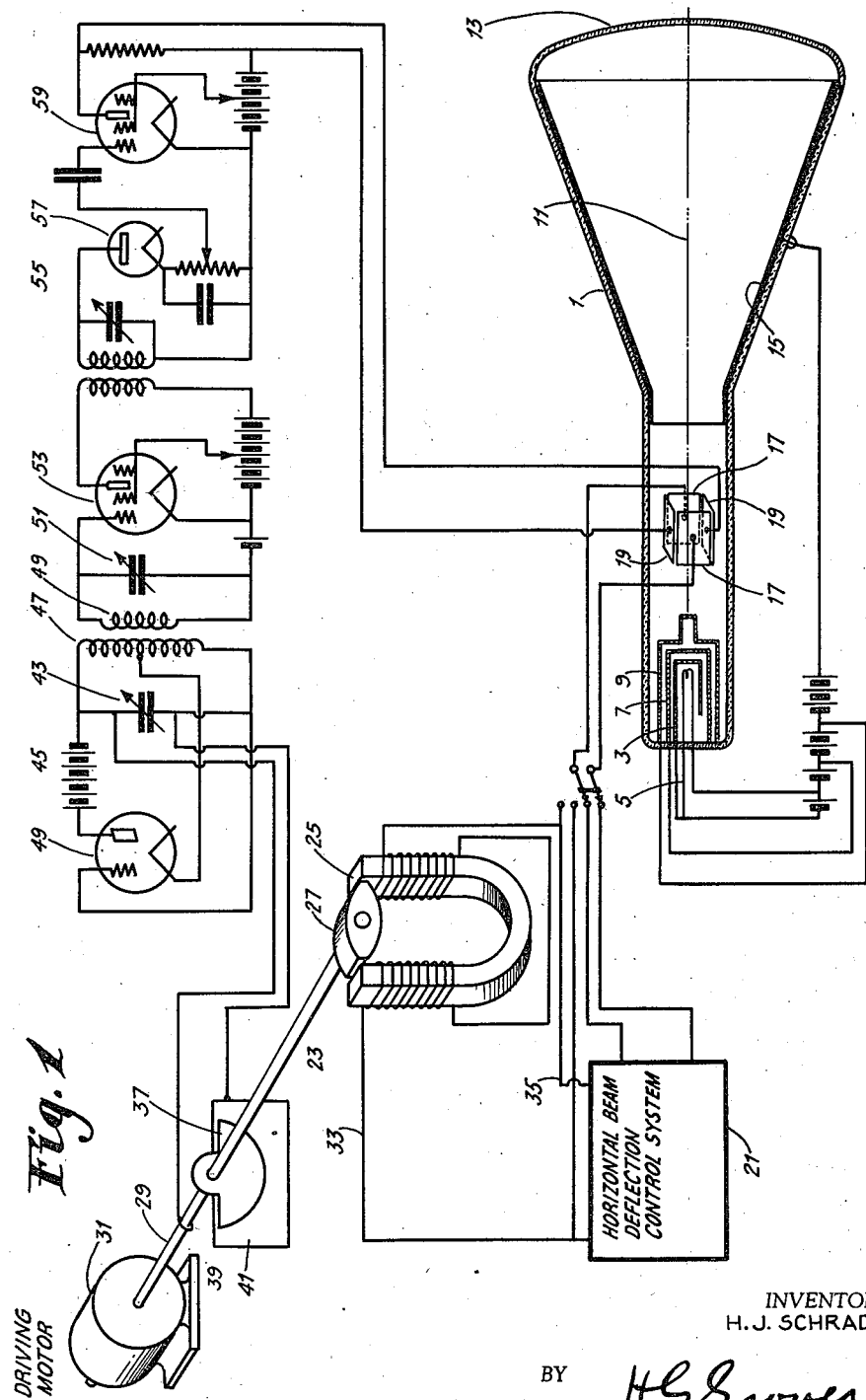
Figure 2:
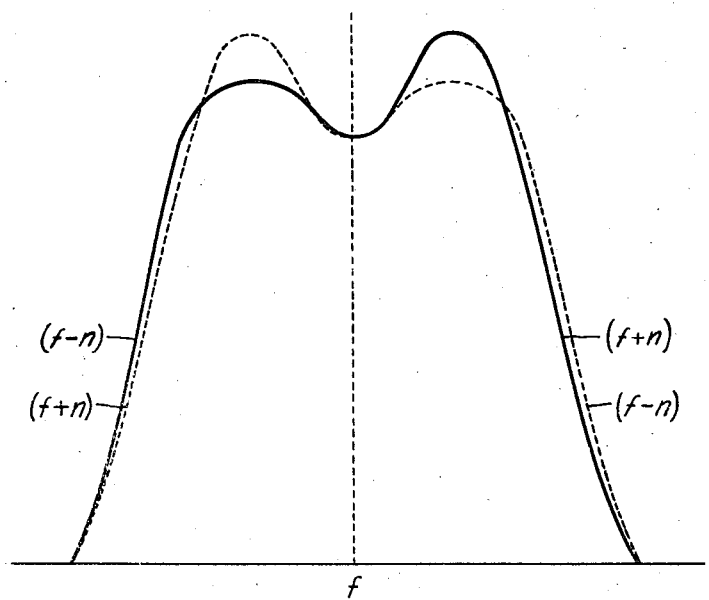

Still other and further objects and advantages of the invention will become apparent by referring to the accompanying drawings in connection with the following specification. By the accompanying drawings the device has been illustrated in one of its preferred applications and as shown, Fig. 1 represents schematically a circuit diagram of a complete operating system; and Fig. 2 represents schematically the general form of wave trace which will appear upon the fluorescent viewing screen of the tube when the device is operated in the particular application to which it has been applied herein for the purpose of disclosing one of the many possible eral arrangements thereof.

If reference is now made to the accompa drawings, it will be seen that there is pr a cathode ray tube 1 which includes the electrode elements comprising the cathode ber 3 heated by the usual type of heater el 5. Immediately surrounding the cathode grid or control electrode 7 to vary the inten: the cathode ray beam when varying vo are applied to the grid. The anode mem completes the formation of the electron gun which a cathode ray beam 11 is projecte ward the fluorescent material coating the surface of the end 13 of the tube. In or provide a suitable electrostatic field for the pose of focusing the electron beam passin yond the anode 9 and also to accelerate the duced electron stream in its passage towar fluorescent viewing screen, there is provic second anode 15 to which a voltage conside higher than that applied to the first anod impressed.

As shown by the drawings, the electron 11 is suitably deflected from both a horizonta a vertical plane by means of suitable electro deflecting elements 17, 17 and 19, 19, altl it is to be understood that electromagneti flecting systems, or a combination of electro and electromagnetic deflecting systems, cou substituted without changing in any wa: manner in which the device is to be operate was disclosed in the above-mentioned applic of A. W. Vance, saw-tooth electrical wave supplied to the deflecting electrodes so as to the beam to be moved at an appropriate across the fluorescent viewing screen. beam controlling electrical impulses, which be assumed to be produced through the discl of an electrical charge stored in a condense ment and the discharge current suitably a fied, as has been disclosed by the aforesaid \ application, is indicated herein as having produced in the conventional type of system erally designated 21.

According to the disclosure of A. W. Vanc controlling impulses applied for deflection poses may be suitably produced so as to ac pany received television signals and after su separation may be used to control the operati the beam deflecting system. By the preser vention, these impulses are locally generatei applied to the horizontal beam deflection c system 21 by way of an impulse generator col tionally designated 23. The impulse gene :elatively simple form of wound stator
1ose output energy is supplied to the
The impulse generator per se con-
tively small permanent magnet 25 or,
:d, an electromagnet on whose two
re coils which are connected in series
her and with the deflection control m in which the invention has been
, two pole iron rotor element 27 is
:evolve between the pole pieces of the
0 as to change the magnetic flux
coils and thus produce a suitable
oltage in the deflection control sys-
is rotor element is preferably con-
he shaft 29 of a suitable drive motor
m any desired power line connection.
lily be seen that by suitably shaping
>s and varying the shape of the rotor
: by varying the spacing between the
nd the rotor element, that the wave
the developed voltage may be varied.
shaping and spacing the rotor and
its, it is possible to generate a so-
oth wave or to generate a wave which
ι very high degree.
ion with uses of the device for the
)f synchronizing the beam deflection
n 21, as would be the case when the
)f the general character disclosed by
)plication, the stator and rotor ele-
Impulse generator are so designed as
peaked wave formation in which the
ise from a minimum to a maximum
ntaneously and then immediately
minimum value. However, if the
ator 23 is to be used for the purpose
the saw-tooth wave formation for
ses, the conductors 33 and 35 shown
with the deflection control system
connected with the deflecting ele- )regoing, it can readily be seen that
ιy beam 11 developed within the tube
so as to sweep rapidly in a horizon-
ι right to left, for example, and then
ost instantly to its starting position
nensurate with the rate at which the
thus the rotor element 37, turns so
of traversal for each cycle of the
and forth across the tube may be
ying the speed of the motor in any
ər.
lar application of the device herein
r use in connection with a cathode
ph system for radio receiver align-
s particular use of the device, there
n the same shaft with the impulse
ιr and the motor, the rotor plates 37
r system generally designated at 39
:s also fixed stator plates 41. The
ons of the rotor elements 27 of the
ator 23 and the condenser plates 37
s use should preferably be such that
f the poles of the rotor is such as to
aximum voltage output when the
ates are totally unengaged. The
nents 39 comprising the rotor plates
tor plates 41 are then connected in
he main tuning capacitor 43 of the
lit conventionally shown as 45.
)r which has been illustrated for the
closing one form which this inven-
ne is the conventional type of oscil-
n the art as the Hartley oscillator
which comprises an inductance element 47 con-
nected between plate and grid electrodes of a tube
49 between whose terminals the main tubing
capacitor 43 is connected. The output of the
oscillator system is supplied through the winding
49 to the circuit under test which may be assumed
to include the circuit comprising the winding 49
and the tube 53 and in which even the input cir-
cuit of the tube 53 is tuned to the normal fre-
quency of the oscillator system 45. The voltage
appearing in the circuit under test is then sup-
plied to a rectifier system herein shown conven-
tionally as 55 which comprises, for example, a
diode 57 and after rectification the output from
the detector, if necessary, is suitably amplified in the amplifying tube system 59. This out-
put voltage is applied to the vertical deflecting
system 19, 19 of the cathode ray tube 1. Thus, it
can be seen that the deflection of the electron
beam in a vertical direction of the tube 1 is at every instant directly proportional to the voltage
in the circuit 49, 51, 53 which is under test.

If, now, it is assumed that the variation in
position of the rotor plates 37 with respect to the
stator plates 41 in the condenser 39 is such as to
vary the normal frequency of the oscillator system
45 by an amount of the order of 2 percent,
it can be seen that the vertical wave trace pro-
duced upon the cathode ray tube will be in ac-
cordance with the showing in Fig. 2. When so
operated the first left to right trace of the cathode
ray across the fluorescent screen coating the inner
end wall 13 of the tube will be represented so that
the trace will first represent a frequency less than
that to which the tube circuit is tuned and then
the frequency value represented will progressively
increase to a value greater than that which the
circuit 49, 51 is tuned, while for the next succes-
sive wave trace the frequency represented will
first be greater than that to which the circuit
49, 51 is tuned and then progressively changed to
a value less than that to which the same circuit
is tuned. All subsequent representations will al-
ternately be repetitions of the two above ex-
plained and the transient effect observable upon
the screen will be a resonance curve of the cir-
cuit under test.

The invention has, of course, been illustrated in
only one of the several forms which it may as-
sume, but many and varied modifications may
readily be made without departing from the spirit
and scope of the foregoing disclosure and, there-
fore, it is assumed that any and all modifications
may be utilized which fall fairly within the spirit
and scope of the hereinafter appended claims.

Having thus described the invention, what is
claimed and desired to secure by Letters Patent is
the following:

1. In oscillograph apparatus, a cathode ray
tube having means therein to produce an electron
beam and a system of deflecting electrodes for
causing the beam produced to trace predetermined
paths across the viewing screen of the tube upon
the application of electrical energy thereto, an
impulse generator adapted to generate electrical
wave forms of predetermined characteristic means
for developing electrical energy of predetermined
wave formation, means to control the frequency of
the developed electrical energy in accordance with
the impulse frequency of the impulse generator
means to supply to the deflecting system the
developed electrical energy to control the motion
of the electron beam in at least one of a plurality
of transverse deflection paths and means to con-
trol the beam by electrical energy whose frequency varies cyclically between two predetermined values.

2. An electronic device comprising a circuit to be tested, a thermionic oscillator coupled with said circuit for supplying energy thereto, means to vary progressively the output energy frequency of the oscillator between maximum and minimum and minimum and maximum values, an impulse generator for developing electrical impulses of frequency corresponding to twice the rate of change of the oscillator frequency between successive maximum or minimum values, an electronic oscillograph, a deflection control device for controlling the deflection of the oscillograph beam in one plane, means for controlling the deflection frequency produced by the control device in accordance with the energy output of the impulse generator, and means to control the deflection of the oscillograph beam in a perpendicular plane in accordance with the frequency of the energy developed in the thermionic oscillator and transferred through the circuit to be tested.

3. The method of testing circuits which comprises supplying electrical energy to the circuit, cyclically varying the frequency of the supplied energy between two predetermined values at a pre-established rate, controlling an electronic beam motion from the output energy of the energized circuit to be tested, developing electrical energy of a frequency related in a predetermined manner to the frequency of the supplied cyclically varying energy, controlling the electronic beam in a perpendicular direction to the first control, synchronizing the last mentioned beam control by the developed electrical energy of frequency related to the cyclically varying frequency energy, and tracing in accordance with the two separate beam controls a visible record of the characteristic of the circuit tested.

4. The system claimed in claim 1, wherein the second named means to control the beam comprises an oscillator of substantially constant frequency, a variable condenser system, means for continually changing the position of the condenser rotor with respect to the stator at a rate corresponding to the frequency of repetition of said impulses developed by said generator, a circuit of which the electrical characteristic is to be measured, said circuit having its output connected with the electron beam deflecting means for controlling the beam deflection in a plane transverse of the direction of control exercised by the generator, and means to change the oscillator frequency by variation of the condenser, and means to supply the energy of the oscillator to the circuit.

5. The method of controlling the deflection of a cathode ray beam as a function of the instantaneous value of a capacity of a tuned circuit, which comprises developing a source of deflection voltage, developing a source of synchronizing signals, controlling the source of deflection voltage by the developed synchronizing signals and controlling both the value of the capacity and the frequency of the synchronizing signals by common energy.

6. In combination, a variable electrical oscillator, a circuit to be tested, means to supply energy from the oscillator to the circuit to be tested, a cathode ray tube having a mutually perpendicular deflecting system, means to supply energy from the circuit to the deflecting system, an unstable saw-tooth generator, means to supply control impulses to the generator, and common means for varying the frequency of the oscillator and the control impulses.

7. In combination, a variable capacity thermionic oscillator, a cathode ray tube including electrostatic beam deflecting means, a source of periodic voltage, a saw-tooth generator, an electric circuit, mechanical means interconnecting the variable capacity and the source of periodic voltage, and electrical means interconnecting the oscillator, the electric circuit, the saw-tooth generator, and the cathode ray tube.

8. In an electrical response analyzing system, the combination of a tunable thermionic oscillator, a variable capacity electrically connected to said oscillator, a cathode ray tube including beam deflecting means, an electric circuit to be tested, means to excite the circuit by the oscillator means connecting the circuit to the beam deflecting means, an unstable saw-tooth generator, common means to control simultaneously the variable capacity and the unstable oscillator, and means connecting the saw-tooth generator to the beam deflecting means whereby a trace of electrical response of the said circuit is produced.

HAROLD J. SCHRADER.